Jan. 26, 1971 S. SCHIBER 3,558,239
POWER STEERING BACK-UP PRESSURE SYSTEM
Filed June 25, 1969 3 Sheets-Sheet 1
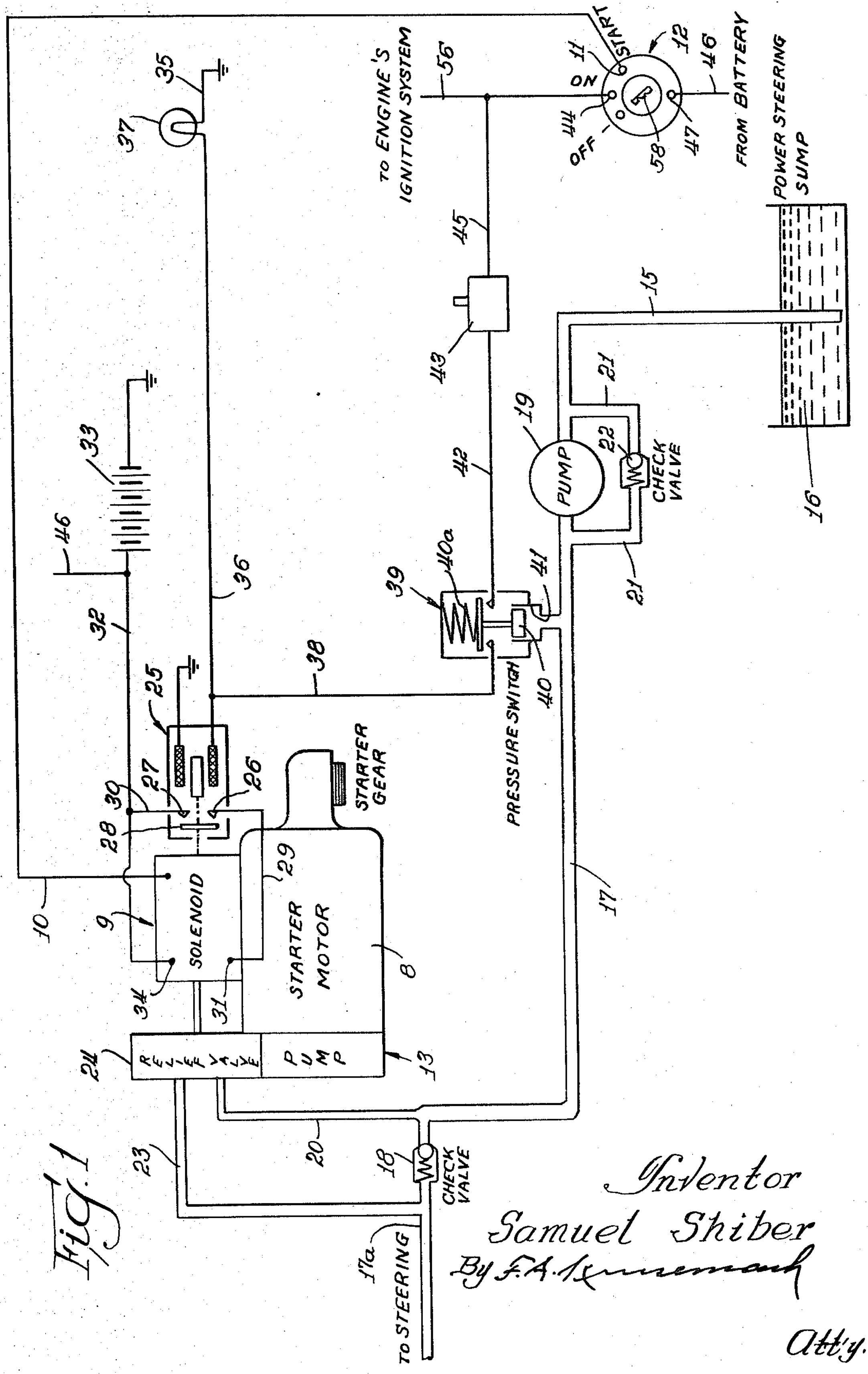
Inventor
Samuel Shiber
By F.A. Kunnemann
Att'y.

POWER STEERING BACK-UP PRESSURE SYSTEM
Filed June 25, 1969 3 Sheets-Sheet 2
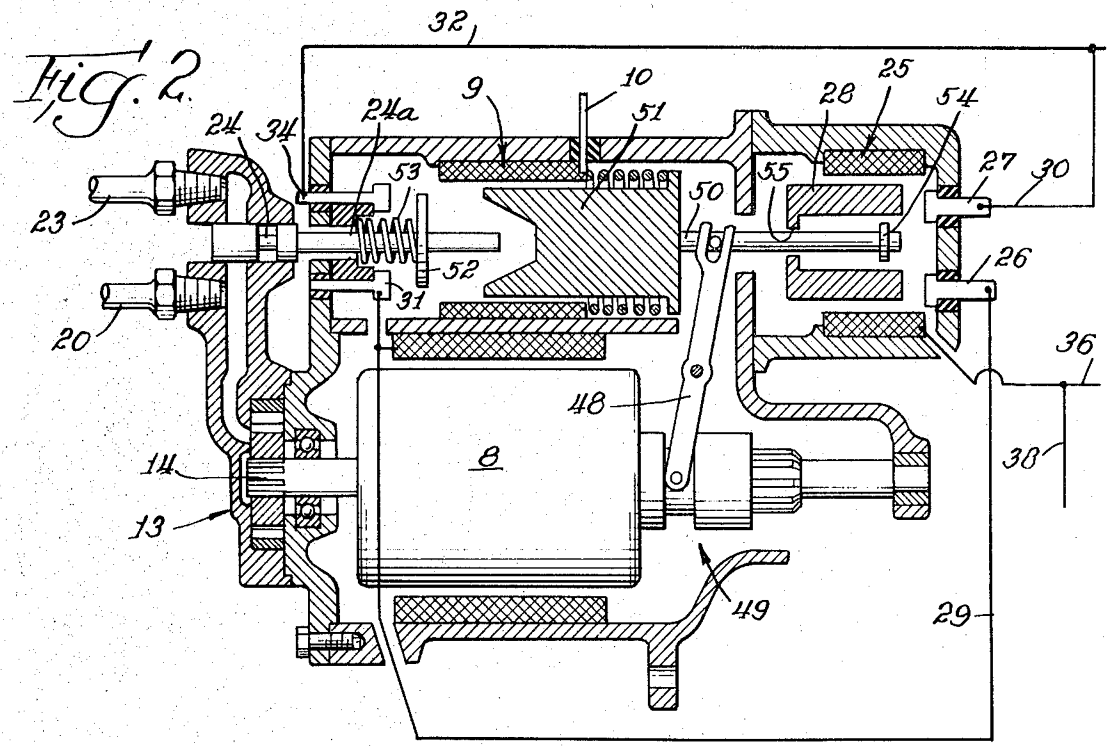
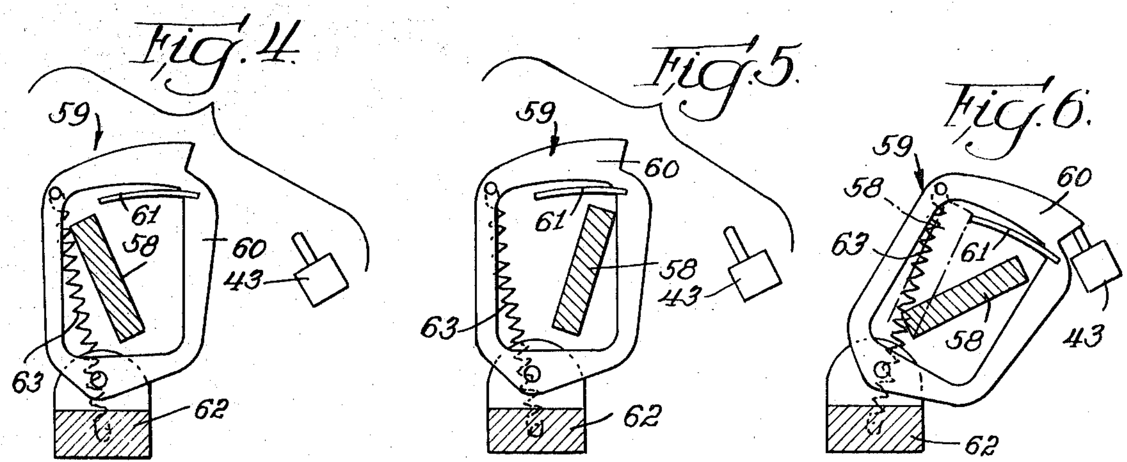
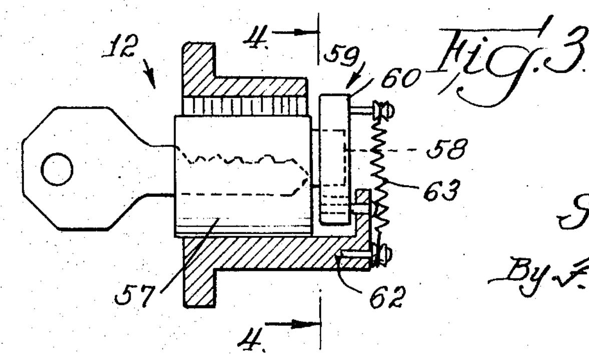
Inventor
Samuel Shiber
By F. A. [signature]
Atty.

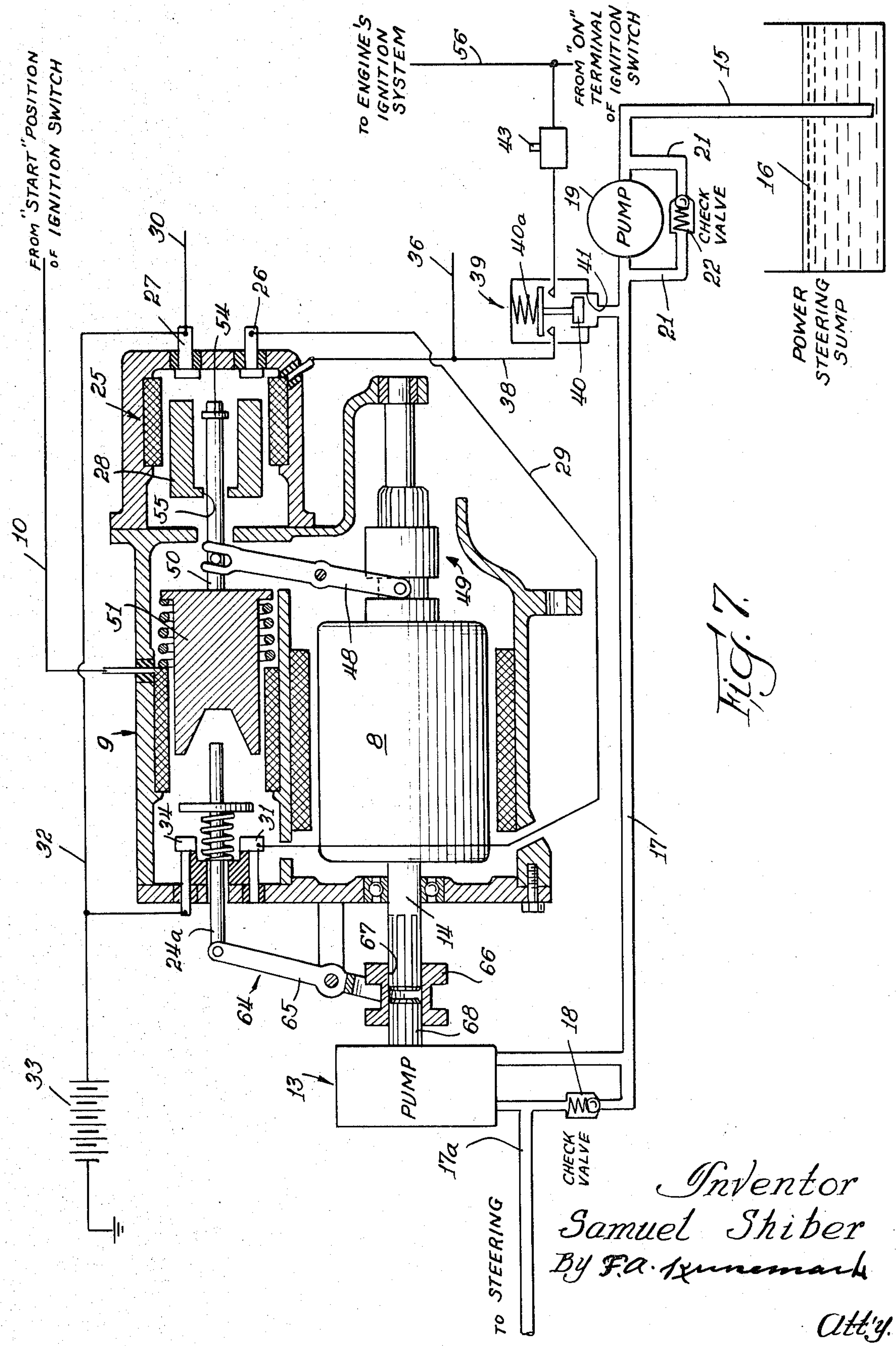
Inventor
Samuel Shiber
By F.A. [illegible]
Att'y.

United States Patent Office 3,558,239

Patented Jan. 26, 1971

3,558,239

POWER STEERING BACK-UP PRESSURE SYSTEM

Samuel Shiber, Chicago, Ill., assignor to Borg-Warner Corporation, Chicago, Ill., a corporation of Illinois Filed June 25, 1969, Ser. No. 836,557
Int. Cl. F04b *41/06, 49/00, 49/10*
U.S. Cl. 417—3 6 Claims

ABSTRACT OF THE DISCLOSURE

The present invention comprises a pressure sensitive switch, that is operably associated with the ignition switch in a manner such that when the servo pump for power steering is not operating, the pressure sensitive switch connects a circuit that will provide current from the battery to the starter motor which operates an auxiliary hydraulic pump for the power steering system.

SUMMARY OF THE INVENTION

Briefly, the preferred embodiment of this invention comprises an auxiliary hydraulic pump which serves as a means for operating the power steering system of a car when the conventional hydraulic pump is inoperative. The auxiliary hydraulic pump is driven by a shaft extension of the starter armature shaft and is provided with a relief valve activated mechanically by a solenoid plunger in a manner such that when the starter motor is cranking the engine, the auxiliary hydraulic pump is relieved. If the conventional hydraulic pump becomes inoperative while engine is running, a pressure sensitive switch completes a circuit to the starter motor from the battery of the car whereby the auxiliary hydraulic pump is driven and thus supplies power to the power steering system, however, cranking action is inoperative.

Accordingly, it is an important object of this invention to provide an auxiliary power means, for operating a power steering system, which uses the starter motor of a car as a source of power for an auxiliary hydraulic pump.

This and other features and advantages of this invention will be apparent from the following specification and claims taken in conjunction with the accompanying drawings in which:

FIG. 1 is a diagrammatic view of the present invention;

FIG. 2 is a horizontal section view of a starting motor including components of the present invention;

FIG. 3 is a cross section view of the switch of the present invention;

FIG. 4 is a view of components of the switch taken on line 4—4, FIG. 3, including a microswitch;

FIGS. 5 and 6 are the same as FIG. 4, except for different positions of the components shown in FIG. 4; and FIG. 7 is a side elevation of a modified form of the present invention.

FIG. 1, a diagrammatic view of the present invention, shows a conventional starter motor 8, currently used in automobiles including a conventional solenoid 9 provided with a lead 10 connected to a starter terminal 11 of a starter switch 12.

An auxiliary hydraulic pump 13 is operably connected to an extended splined shaft 14 as an additional adjunct of the conventional starter motor 8. An input fluid passage 15 connected to a sump 16 and an output fluid passage 17 provided with a check valve 18 is connected to the power steering system.

An auxiliary hydraulic pump 13 is driven by the conventional starter motor 8 and is provided with an auxiliary input fluid passage 20 connected to output fluid passage 17 which serves as an input fluid passage by bypassing the conventional hydraulic pump 19 through a fluid passage 21 provided with a check valve 22 and connected to the input fluid passage 15. An auxiliary output fluid passage 23 for the auxiliary hydraulic pump 13 is connected to the power steering system by way of output fluid passages 17 and 17*a*. A relief valve 24 operably functions with respect to the auxiliary input fluid passage 20 and the auxiliary output fluid passage 23 thereby serving to relieve the auxiliary hydraulic pump 13 when the starter motor is cranking the engine.

An auxiliary solenoid 25, provided with terminals 26 and 27, is engageable with an auxiliary solenoid plunger 28. Leads 29 and 30 interconnect the terminals 26 and 27 to a solenoid terminal 31 and a lead 32 respectively interconnects a battery 33 with a solenoid terminal 34. The auxiliary solenoid 25 is provided with a lead 35 to ground and a lead 36 to a warning lamp 37, and a warning lamp 37 is provided with a lead 37*a* to ground.

A lead 38 interconnects the lead 36 with a normally closed pressure switch 39 provided with a piston 40 engaging a compression spring 40*a*, and is operable in a cylinder 41 in fluid communication with the output fluid passage 17. A lead 42 interconnects the normally closed pressure switch 39 and a microswitch 43 which is connected to an on terminal 44 of the starter switch 12 by a switch ignition lead 45, and a lead 46 connects terminal 47 of the starter switch 12 to the battery 33.

Referring now to FIG. 2. A pivoted lever 48 is operably connected at opposite ends thereof to a conventional meshing mechanism 49 of the conventional starter motor 8 and to a shaft 50 connected to a solenoid plunger 51 which at the forward end is operably associated with the relief valve 24 provided with a shaft means 24*a* which carries a switch contact 52 that is urged to a normally open position by a spring 53. The rearward end of the shaft 50 is provided with a collar 54 operably engageable with an annulus 55 of the auxiliary solenoid plunger 28.

FIGS. 3, 4, 5 and 6 delineate the components of the starter switch 12. A lead 56 interconnects the switch ignition lead 45 with the engine ignition system. The components of the starter switch 12 comprise a tumbler cylinder 57 having a protuberance 58 operably associated with an over center lever 59, viewed on line 4—4, FIG. 3 and are the same as FIGS. 4, 5 and 6 except as to positions. The over center lever 59 comprises a pivoted frame-like structure 60 provided with a leaf spring 61, and is pivotally mounted on a support 62. A tension spring 63 is connected at one end to the upper end of the frame-like structure 60 and at the other end to the support 62 thereby urging the over center lever 59 to a leftward position.

FIG. 7 shows a modified version of the invention shown in FIGS. 1, 2, 3, 4, 5 and 6, the difference residing in a mechanical means 64 for shutting off the auxiliary hydraulic pump 13 instead of the relief valve 24.

The mechanical means 64 comprises a pivoted arm 65 is operably connected at its front end to the shaft means 24*a* and at the opposite end is in engagement with a splined collar 66 having a splined cylindrical bore 67 engaging the splined drive shaft 14 and a splined driven shaft 68 of the auxiliary hydraulic pump 13.

OPERATION

FIGS. 1, 2, 3, 4, 5 and 6 relate to the preferred form of the present invention.

Initially the key 57*a* in the starter switch 12 is in off position as shown in FIG. 4.

When a key 57*a* is turned to on position, shown in FIG. 5, the protuberance 58 does not move the pivoted frame-like structure 60, and therefore, the microswitch 43 is left in its open position and the switch ignition leads 45 and 56 are energized. A further turn of the key 57*a* puts it in the start position causing the protuberance 58 to engage the pivoted frame-like structure 60 to contact the microswitch 43 and put it in the closed position. However, the pressure switch 39 will move to open position during the cranking of the engine, because pressure is built up in the output fluid passage 17 which moves the piston 40 against the tension spring 40*a* thereby opening the pressure switch 39 which disconnects the lead 38 and 42 thereby disconnecting the auxiliary solenoid 25, and the conventional solenoid 9 is activated by the electric current delivered by lead 10 which is connected to the battery 33 by lead 46, thereby causing the plunger 51 to move forward, thus moving the pivoted lever 48 in a direction so as to provide conventional starting engagement of the conventional starter motor 8 with the engine and at the same time providing electrical current to the conventional starter motor 8 by the forward movement of the shaft means 24*a* induced by the solenoid plunger 51 by its contact therewith, thus engaging the switch contact 52 with the solenoid terminals 31 and 34 thereby completing the electric circuit which may be termed the primary motor starter circuit and thus energizing the conventional starter motor 8, which cranks the engine. Also, the forward movement of the shaft means 24*a* causes the relief valve 24 to shut off communication between the sump 16 and the auxiliary hydraulic pump 13 while the engine is being cranked thereby making it inoperative at this stage.

When the engine starts, the switch key is released which causes the tumbler cylinder 57 to move to the left, thereby breaking the cranking circuit, leads 10 and 46, and operates on the ignition circuit, leads 45, 46 and 56. These events are conventional. The protuberance 58 has taken the position shown in FIG. 6 and held thereby a leaf spring 61, and therefore, the starter switch 12 cannot be turned to the right unless preceded by a left turn which releases it from the leaf spring 61.

If the conventional hydraulic pump 19 fails to operate, the pressure switch 39 takes the on position because of the pressure drop in the output fluid passage 17 whereby the piston 40 can no longer overcome the valve of the tension spring 40*a*. Thus, leads 38, 45 and 46, an electric circuit from the battery 33 to the auxiliary solenoid 35, is activated thereby causing the auxiliary solenoid plunger 28 to interconnect terminals 26 and 30 thus providing an electric current through lead 29 to the conventional starter motor 8, that may be termed the secondary motor starter circuit which drives the auxiliary hydraulic pump 13 that receives fluid from the sump 16 via the input passages 15, 21 and the normally output passage 17, which now becomes the input passage, and the passage 20, whereby fluid is delivered from the hydraulic pump 13 through passage 23 and the output passage 17*a* thus providing power assist to the conventional steering mechanism. Also a warning light 37 is turned on by its connection to lead 38 by the lead 37. Obviously, the driver will stop his car at the earliest opportunity and restart the engine. As above mentioned, it is necessary to turn the switch key to the left to free it from the leaf spring 61 and then turn it to the right to again start the engine.

A modified form or version of the present invention shown in FIG. 7 performs in the same manner as the preferred form. The difference resides in different components and their arrangement. For example, in the preferred form the relief valve 24 is provided to take the load off the auxiliary hydraulic pump 13 when the conventional starter motor 8 cranks the engine. In this version, the auxiliary hydraulic pump 13 is disconnected from the conventional starter motor 8 during cranking by a mechanical means 64 which comprises a pivoted arm 65 which is in engagement with a splined collar 66 whereby the splined driven shaft 68 is disengaged from the splined drive shaft 14 when the solenoid plunger 51 engages the shaft means 24*a* and moves it forward thereby moving the splined collar 66 in a direction which disengages it from the splined drive shaft 68 thereby disengaging the auxiliary hydraulic pump 13 from the conventional starter motor 8.

When the engine starts, conventional starting motor 8 is disengaged and is connected to the auxiliary hydraulic pump 13 by the splined collar 66. When the engine stalls the same sequence of events occur as in the preferred form of the present invention whereby the auxiliary hydraulic pump 13 is driven, thereby providing power assist to the conventional steering mechanism.

While preferred and alternate embodiments of the present invention have been shown and described, it is to be understood that variations thereof are included within the spirit of the invention and the scope of the following claims.

I claim:

1. In a power steering back-up system for a conventional power steering system including a conventional hydraulic pump comprising;

(a) a starting switch operably connectable to a primary motor starter circuit and a secondary motor starter circuit, the said starting switch having means operably engageable with a switch means connected to the said secondary motor starter circuit,
(b) an auxiliary hydraulic pump operably connected to a shaft of a conventional starting motor,
(c) fluid passage means operably connected to the said conventional power steering system,
(d) a relief valve serving said fluid passage means provided with a shaft operably associated with a solenoid plunger of a conventional solenoid,
(e) a pressure switch in second secondary motor starter circuit operably associated with said fluid passage means, said pressure switch being provided with a sensing means exposed to the fluid pressure in the said fluid passage means whereby said pressure switch is in the open position when the said conventional power steering system is operating,
(f) an auxiliary solenoid connected to the said secondary motor starter circuit and the said conventional solenoid whereby the said conventional starter motor drives the said auxiliary hydraulic pump, thereby providing fluid to the said hydraulic power steering system when the said conventional hydraulic pump is inoperative.

2. In a power steering back-up system according to claim 1 wherein a warning light is connected to the said secondary motor starter circuit.

3. In a power steering back-up system according to claim 1 wherein the said starting switch is provided with a leaf spring engageable with said protuberance.

4. In a power steering back-up system for a conventional power steering system including a conventional hydraulic pump comprising;

(a) a starting switch operably connectable to a primary motor starter circuit and a secondary motor starter circuit, the said starting switch having a tumbler provided with a protuberance operably engageable with a pivotally mounted frame-like structure engageable with a microswitch connected to the said secondary motor starter circuit,
(b) an auxiliary hydraulic pump having a splined driven shaft operably connected to a splined drive shaft of a conventional starting motor,
(c) fluid passage means operably connected to the said conventional power steering system,
(d) a shaft means operably connectable to a solenoid plunger of a conventional solenoid and pivotally connected to a splined collar serving to engage said extended splined drive shaft and a splined driven shaft,
(e) a pressure switch in said secondary motor starter circuit operably associated with said fluid passage means, said pressure switch being provided with a piston that is exposed to the fluid pressure in the said fluid passage means whereby said microswitch is in the open position when the said conventional power steering system is operating, (f) an auxiliary solenoid connected to the said secondary motor starter circuit and the said conventional solenoid whereby the said conventional starter motor drives the said auxiliary hydraulic pump, thereby providing fluid to the said hydraulic power steering system when the said conventional hydraulic pump is inoperative.

5. In a power steering back-up system according to claim 4 wherein a warning light is connected to the said secondary motor starter circuit.

6. In a power steering back-up system according to claim 4 wherein the said starting switch is provided with a leaf spring engageable with said protuberance.

References Cited

UNITED STATES PATENTS

| | | |
|---|---|---|
| 1,376,411 | 5/1921 | Eaton. |
| 2,163,764 | 6/1939 | Rockwell. |
| 2,954,671 | 10/1960 | Kress. |
| 2,655,111 | 10/1953 | Schanzlin. |
| 2,966,902 | 1/1961 | Hallinger. |

WILLIAM L. FREEH, Primary Examiner

U.S. Cl. X.R.

417—15, 28, 313, 505